United States Patent
Kim et al.

(10) Patent No.: US 8,586,188 B1
(45) Date of Patent: Nov. 19, 2013

(54) PROTECTIVE FILMS OR PAPERS FOR GLASS SURFACES AND METHODS THEREOF

(71) Applicant: Corning Incorporated, Corning, NY (US)

(72) Inventors: Hongkyu Kim, Old Bridge, NJ (US); James Robert Matthews, Painted Post, NY (US); Wanda Janina Walczak, Big Flats, NY (US); Liming Wang, Painted Post, NY (US); Ruchirej Yongsunthon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/687,204

(22) Filed: Nov. 28, 2012

(51) Int. Cl.
 *B32B 17/08* (2006.01)
 *B65B 33/00* (2006.01)
 *B05D 1/32* (2006.01)
 *C09D 5/00* (2006.01)

(52) U.S. Cl.
 USPC .......... 428/438; 427/154; 427/155; 428/439; 428/441; 428/442; 428/516; 428/523

(58) Field of Classification Search
 USPC .......... 427/154, 155; 428/438, 439, 441, 442, 428/516, 523
 See application file for complete search history.

(56) References Cited

U.S. PATENT DOCUMENTS

| | | | |
|---|---|---|---|
| 5,500,467 A | 3/1996 | Mahood | 524/100 |
| 6,379,746 B1 | 4/2002 | Birch et al. | 427/154 |
| 6,715,316 B2 | 4/2004 | He et al. | 65/23 |
| 6,896,928 B2 | 5/2005 | Allaire et al. | 427/154 |
| 7,662,466 B2 | 2/2010 | Seeboth et al. | 428/220 |
| 2003/0118735 A1 | 6/2003 | Gole et al. | 427/384 |
| 2009/0030877 A1 | 1/2009 | Jain et al. | 1/1 |
| 2009/0258187 A1 | 10/2009 | Brady et al. | 428/131 |
| 2010/0041466 A1 | 2/2010 | Wang et al. | 463/22 |
| 2010/0297392 A1 | 11/2010 | Chen et al. | 428/141 |
| 2012/0132053 A1 | 5/2012 | Matthews et al. | 83/879 |

FOREIGN PATENT DOCUMENTS

| | | |
|---|---|---|
| WO | 2011/006031 | 1/2011 |
| WO | 2011/118502 | 9/2011 |

*Primary Examiner* — D. S. Nakarani
(74) *Attorney, Agent, or Firm* — John L. Haack

(57) ABSTRACT

A protective paper or film and a method of protecting a glass substrate by applying the protective paper or film having a slip agent composition onto a surface of a glass substrate. The slip agent composition comprises at least one fatty alcohol as defined herein.

20 Claims, 12 Drawing Sheets

PROTECTIVE FILMS OR PAPERS FOR GLASS SURFACES AND METHODS THEREOF

TECHNICAL FIELD

The embodiments described herein generally relate to protecting glass article surfaces during finishing and packaging, and more specifically to protective films or papers that provide glass surface protection during finishing, packaging and/or transportation of glass articles.

BACKGROUND

Liquid crystal displays (LCDs), organic light emitting displays (OLEDs) and other opto-electronic displays often require the use of glass substrates having at least one surface that is substantially free of scratches and other defects. For example, LCD displays and photovoltaic glasses, typically require glass substrates with pristine surfaces that are substantially free of inorganic particles and scratches (i.e., defects). Unfortunately, the production of such glass substrates typically requires multiple steps of surface scoring, glass splitting, edge grinding and polishing, each of which could generate a large number of glass particles that can travel at a certain speed to impact the quality area of the glass surface. The flying particles can scratch the glass surface, leaving permanent damage, or adhere to the glass surface with a sufficiently strong bond that would survive subsequent washing and cleaning steps. Such residual glass particles on the glass surface can lead to defects in coatings and/or semiconductor devices, such as transistors, deposited on the glass in downstream processes.

In addition, glass substrates may be shipped from a substrate fabrication factory to a substrate user at a different location. In shipping glass substrates from one location to another, multiple glass sheets may be packed into a container. Even though the glass containers may be sealed, particles and other contaminants may nonetheless come into contact with the quality surface area of the sheet, causing unwanted surface damage.

Conventional methods for protecting glass article surfaces include the use of paper, plastic films, coatings such as polysaccharides, surfactants, and the like. Some specific glass surface protective methods include, for example, the use of polymer films or papers formulated with fatty amides, such as erucamide. However, these methods suffer from various drawbacks. The polymer films or papers can leave an organic residue after removal of the paper or film from the surface of the glass. The residues are migratory organic compounds, originating mostly from the fatty amide, that can be difficult to remove by washing. The residual fatty amide present on the glass surface after washing can cause a mura effect and, in some instances, cause or enhance the formation of stains on the glass surface.

Therefore, alternative methods for protecting the surface of glass articles during finishing, packaging, and transportation are disclosed herein.

SUMMARY

In embodiments, method of protecting a glass substrate is disclosed. The method comprises contacting a protective film or paper and at least one surface of a glass substrate, wherein the protective film or paper includes a slip agent composition comprising at least one fatty alcohol having the formula R—OH, wherein R is a saturated or unsaturated, linear or branched aliphatic chain containing 12 to 30 carbon atoms.

In embodiments, a method for temporary protection of a glass substrate is disclosed. The method comprises contacting a protective film or paper having a slip agent composition and at least one surface of a glass substrate, the slip agent composition comprising at least one fatty alcohol having the formula R—OH, wherein R is a saturated or unsaturated, linear or branched aliphatic chain containing 12 to 30 carbon atoms, transferring a portion of the slip agent composition from the protective film or paper to the surface of the glass substrate, and removing the protective film or paper from the surface of the glass substrate such that an amount of the slip agent composition remains on the surface of the glass substrate.

In embodiments, a composite glass package is disclosed. The composite glass package comprises a glass substrate, and a protective paper or film adhered to a surface of the glass substrate, wherein the protective paper or film includes a slip agent composition comprising at least one fatty alcohol having the formula R—OH, wherein R is a saturated or unsaturated, linear or branched aliphatic chain having 12 to 30 carbon atoms.

In embodiments, a method of forming a coating layer on a substrate is disclosed. The method comprises heating a slip agent composition to a temperature sufficient to vaporize a portion of the at least one fatty alcohol such that a vapor having a condensation temperature is formed, wherein the slip agent composition comprises at least one fatty alcohol having a formula R—OH, wherein R is a saturated or unsaturated, linear or branched aliphatic chain containing 12 to 30 carbon atoms, and exposing at least a portion of a surface of a substrate to the vapor, wherein the surface of the substrate has a temperature below the condensation temperature of the vapor such that the vapor condenses on the surface of the substrate to form a coating layer.

In embodiments, a method of manufacturing a protective polymer film is disclosed. The method comprises combining a slip agent composition and a protective polymer film, wherein the slip agent composition comprises at least one fatty alcohol having the formula R—OH, wherein R is a saturated or unsaturated, linear or branched aliphatic chain containing 12 to 30 carbon atoms.

In embodiments, a method for packaging glass substrates is disclosed. The method comprises positioning a protective paper or film formulated with a slip agent composition between a first glass substrate and a second glass substrate, wherein the slip agent composition comprises at least one fatty alcohol having a formula R—OH, wherein R is a saturated or unsaturated, linear or branched aliphatic chain containing 12 to 30 carbon atoms, forming a stack having at least a portion of the protective paper or film disposed between and contacting the first glass substrate and the second glass substrate, and placing the stack in a container.

Additional features and advantages of the embodiments for glass protective polymer films or papers, methods and uses thereof described herein will be set forth in the detailed description which follows, and in part will be readily apparent to those skilled in the art from that description or recognized by practicing the embodiments described herein, including the detailed description which follows, the claims, and the appended drawings.

Both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

In embodiments.

DETAILED DESCRIPTION

Figure 1:
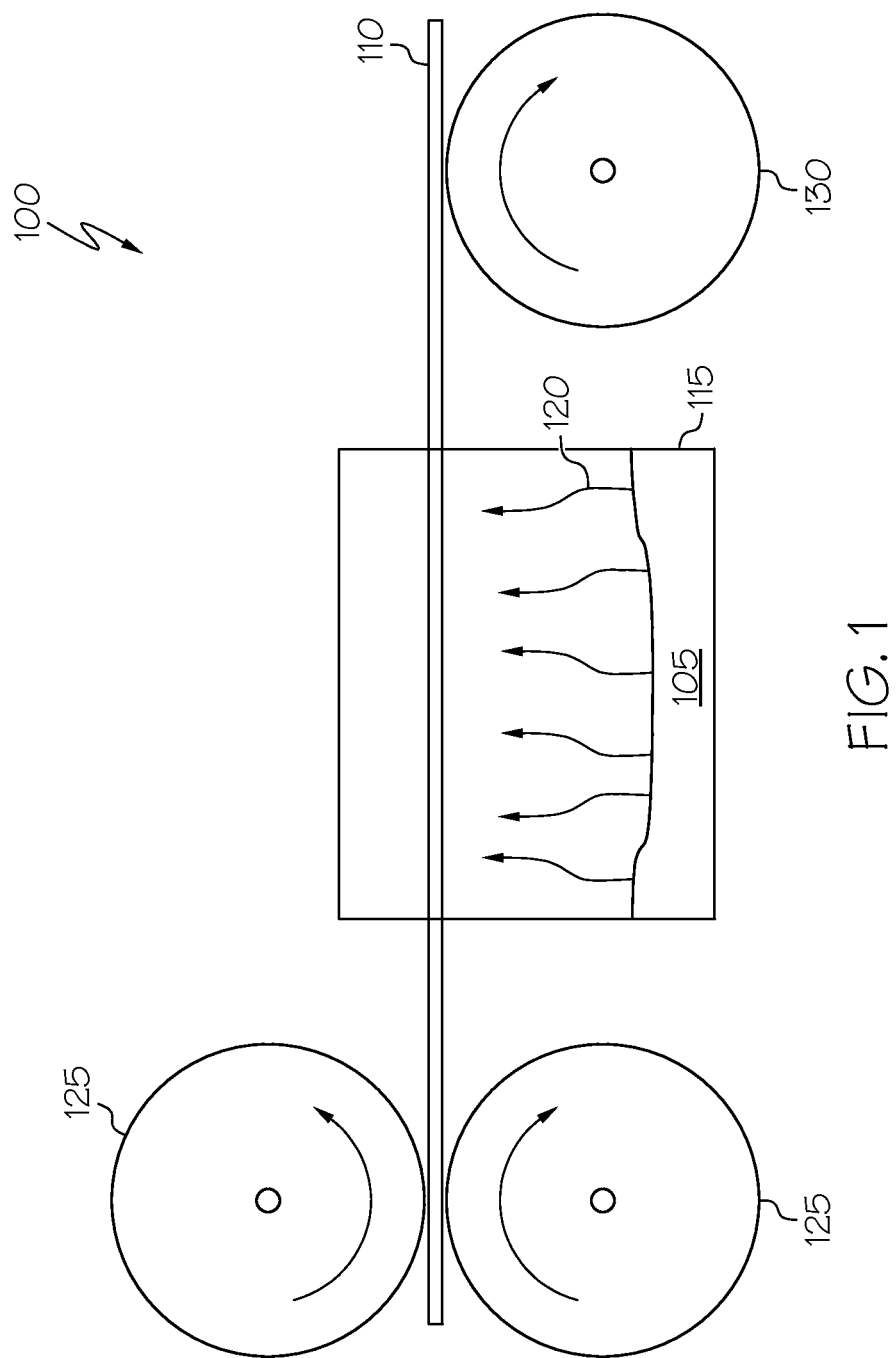
FIG. 1 schematically depicts a method for forming a fatty alcohol coating layer on a paper substrate by vapor deposition.

Reference will now be made in detail to embodiments of protective films or papers formulated with fatty alcohols, methods for making these protective films or papers, and methods for protecting glass articles using these protective films or papers, examples of which are illustrated in the accompanying drawings. Whenever possible, the same reference numerals will be used throughout the drawings to refer to the same or like parts. Disclosed herein are methods of formulating a substrate with a slip agent composition.

In embodiments, a coating layer is formed on a paper or polymer substrate. The method generally comprises providing a slip agent composition comprising at least one fatty alcohol, heating the slip agent composition to a temperature sufficient to vaporize a portion of the at least one fatty alcohol such that a vapor having a condensation temperature is formed, and exposing at least a portion of a surface of a paper or polymer substrate to the vapor, wherein the surface of the paper or polymer substrate has a temperature below the condensation temperature of the vapor such that the vapor condenses on the surface of the paper or polymer substrate forming a coating layer.

In embodiments, a polymer substrate is impregnated with a slip agent composition. The method generally comprises providing a slip agent composition comprising at least one fatty alcohol, admixing the slip agent composition and at least one polymer to form a molten polymer mixture, and forming the polymer mixture into a polymer film. In embodiments, the at least one polymer is a polymer melt admixed with the slip agent composition. In embodiments, the polymer mixture may also be a polymer melt during subsequent processing steps. The polymer film may be formed by typical commercial processes, including, for example, cast film and blown film processes, which are shown and described in further detail herein.

The paper substrates described herein may be formed from a variety of papers, for example, the paper may be formed from glassine, Kraft paper, parchment paper, recycled paper, cellulosic paper, etc. In embodiments, the paper substrate may be in the form of a sheet or a continuous web. The web can be newly formed or be a pre-formed web.

Examples of suitable polymers that may be used for the polymer substrate include polymers having a low adherence to glass, such as polyolefins, low density polyethylene, polyethylene film, ethylene-acrylic acid (EAA) copolymers, ethylene-vinyl acetate (EVA) copolymers, nylon polymers, polyethylene terephtalate polymers, polyvinyl chloride polymers, or polypropylene, and combinations thereof. In embodiments, the polymer is a low density polyethylene or a Visqueen® film. The polymer substrate may be in the form of a sheet or a continuous web that may be formed in any conventional manner, such as, for example, by extrusion.

The slip agent composition comprises at least one fatty alcohol. The terms "long chain fatty alcohol" and "fatty alcohol" may be used herein interchangeably. In embodiments, the fatty alcohol may be present in the slip agent composition in an amount greater than about 75 wt. %, 85 wt. %, 90 wt. %, 95 wt. % or 99 wt. %, based on the total weight of the slip agent composition. In embodiments, the fatty alcohol may be present in the slip agent composition in an amount from about 50 wt. % to about 99 wt. %, from about 50 wt. % to about 95 wt. %, from about 50 wt. % to about 90 wt. %, from about 50 wt. % to about 85 wt. %, or from about 50 wt. % to about 75 wt. %, based on the total weight of the slip agent composition.

The fatty alcohol is a compound comprising a hydrocarbon chain having from 12 to 30 carbon atoms and having at least one hydroxyl group. In embodiments, the hydrocarbon chain may have 12 to 26 carbon atoms, 16 to 24 carbon atoms, or 18 to 22 carbon atoms. In embodiments, the fatty alcohol may have 1, 2, 3 or 4 hydroxyl groups attached to the hydrocarbon chain. In embodiments, the fatty alcohol may have a primary, secondary and/or tertiary hydroxyl group attached to the hydrocarbon chain.

The fatty alcohol corresponds to the chemical formula:

wherein R is a saturated or unsaturated, linear or branched aliphatic chain containing 12 to 30 carbon atoms, 12 to 26 carbon atoms, 16 to 24 carbon atoms, or 18 to 22 carbon atoms. Where R is unsaturated, R can have one or more points of unsaturation. In embodiments, the R group is at least about 12, 13, 14, 15, 16, 17, 18, 19, 20, 21, 22, 23, 24, 25, 26, 27, 28, 29 or 30 carbons in length. The branched chains may have one or more points of branching along the aliphatic chain. In addition, the branched chains may include cyclic branches.

In embodiments, the fatty alcohols may be linear, saturated fatty alcohols comprising from 12 to 30 carbon atoms, 12 to 26 carbon atoms, 16 to 24 carbon atoms, or 18 to 22 carbon atoms. The fatty alcohols correspond to the following chemical formula:

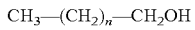

$$CH_3—(CH_2)_n—CH_2OH$$

wherein n is an integer from 10 to 24, for example, or from 14 to 20. In embodiments, the fatty alcohols can be chosen from branched fatty alcohols containing from 13 to 30 carbon atoms.

Non-limiting examples of suitable fatty alcohols include lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, linoleyl alcohol, arachidyl alcohol, behenyl alcohol, erucyl alcohol, and/or combinations thereof. In embodiments, the fatty alcohol comprises, or is selected from the group consisting of, stearyl alcohol, behenyl alcohol, and/or combinations thereof. In embodiments, the fatty alcohol comprises, or is selected from the group consisting of, stearyl alcohol.

In embodiments, the fatty alcohol comprises 18 carbon atoms. It is believed that fatty alcohols comprising 18 carbon atoms may be particularly suitable due to its melting point, flash point, stability in air, ability to form desired coating patterns on glass surfaces, removability, and cost. Examples of fatty alcohols having 18 carbon atoms include, but are not limited to, aliphatic alcohols such as stearyl alcohol, isostearyl alcohol, elaidyl alcohol, oleyl alcohol, linoleyl alcohol, elaidolinoleyl alcohol, linolenyl alcohol, elaido lino lenyl alcohol, ricino leyl alcohol, and/or combinations thereof.

Without being bound by theory, it is believed that for fatty alcohols to confer meaningful protection to the glass surface, the number of carbon atoms should be at least 12. This is because short-chain fatty alcohols (i.e., fatty alcohols having less than 12 carbon atoms) can have a relatively high volatility around room temperature and during glass finishing and handling temperatures, thereby reducing its effectiveness in surface protection. In addition, short-chain fatty alcohols can be unstable in air under coating finishing conditions and/or glass surface finishing conditions, leading to less than desired surface protection capabilities. However, the use of fatty alcohols comprising more than 40 carbon atoms can have a melting point that is too high, and/or a partial pressure that is too low during glass substrate finishing/handling conditions, making them very difficult to use. In addition, the use of fatty alcohols having more than 40 carbon atoms tend to leave organic residues on the glass surface that are not easily removed.

It is also believed that the hydrophilic group of the fatty alcohol forms a strong bond with the hydrophilic group on the surface of the sheet material to be protected. For example, where the sheet material has an oxide glass surface comprising surface —OH groups, the surface —OH groups may hydrogen bond with the —OH group of the fatty alcohol as schematically illustrated below:

surface-O-carbon chain.

The molecules of the fatty alcohol may also bond with the sheet surface through the formation of a covalent bond, van der Waals force, or other mechanism.

The slip agent composition may optionally comprise additives that can include, for example, organic solvents, water, ethanol, acetone, or mixtures thereof. In some examples, the additive is present in an amount of less than about 25 wt. %, 20 wt. %, 15 wt. %, 10 wt. %, 5 wt. %, 3 wt. % or 1 wt. %, based on total weight of the slip agent composition. In other examples, the additive is present in an amount from about 0.01 wt. % to about 25 wt. %, from about 0.01 wt. % to about 20 wt. %, from about 0.01 wt. % to about 15 wt. %, from about 0.01 wt. % to about 10 wt. %, from about 0.01 wt. % to about 5 wt. %, from about 0.01 wt. % to about 3 wt. % or from about 0.01 wt. % to about 1 wt. %, based on total weight of the slip agent composition.

To deposit a layer of fatty alcohol onto the paper or polymer substrate, the paper or polymer substrate may be maintained at a temperature lower than the melting point of the fatty alcohol. If the temperature of the paper or polymer substrate is too high, the fatty alcohol may readily oxidize or have too high of a vapor pressure, leading to insufficient or uneven coating of the fatty alcohol on the paper or polymer substrate. In addition, the insufficient or uneven coating may not have the desired level of adhesion force, coefficient of friction, and hydrophobicity.

In embodiments, the slip agent composition is heated to a temperature of from about 75° C. to about 125° C. to facilitate deposition of the fatty alcohol on the substrate. In embodiments, the slip agent composition is heated to a temperature of from about 80° C. to about 115° C. In embodiments, the slip agent composition is heated to a temperature of from about 85° C. to about 110° C. In embodiments, the slip agent composition is heated to a temperature that is greater than about 80° C. to facilitate deposition of the fatty alcohol on the substrate.

The paper or polymer substrate is exposed to the vapor for a period of time sufficient to form a coating layer on the paper or polymer substrate. In embodiments, the paper or polymer substrate is exposed to the vapor for a period of time of from about 30 seconds to about 10 minutes. In embodiments, the paper or polymer substrate is exposed to the vapor for a period of time of from about 1 minute to about 10 minutes. In embodiments, the paper or polymer substrate is exposed to the vapor for a period of time of from about 1 minute to about 5 minutes.

The amount of the fatty alcohol condensed or deposited onto the polymer or paper substrate may be determined by a variety of factors, including, for example, the temperature of the vapor, the temperature of the polymer film or paper, the flow rate of the vapor, and the period of time the polymer film or paper is exposed to the vapor. Due to the small amount of coating material required to be deposited onto the polymer film or paper in order to provide adequate glass surface protection, the coating process can be completed in a short period of time. This is particularly desirable for high-throughput continuous processes. In embodiments, the amount of the fatty alcohol condensed or deposited onto the polymer film or paper may be at least about 200 nanograms/cm$^2$, at least about 400 nanograms/cm$^2$, or at least about 600 nanograms/cm$^2$. In embodiments, the amount of the fatty alcohol condensed or deposited onto the polymer film or paper can be, for example, from about 200 to about 2500 nanograms/cm$^2$, from about 400 to about 2000 nanograms/cm$^2$, and from about 600 to about 1500 nanograms/cm$^2$, including intermediate values and ranges.

Referring to FIG. 1, a vapor deposition process (100) for depositing a fatty alcohol (105) coating layer on a paper substrate (110) is schematically depicted. A slip agent composition (105) comprising at least one fatty alcohol is provided to a vessel (115). The slip agent composition (105) may be provided in the form of a liquid, wax, or other solid. As used herein, the term "wax" refers to a compound that is primarily solid at room temperature and standard pressure (25° C. and 760 mmHg), with a solid/liquid reversible change of state at elevated temperatures and/or pressures. The slip agent composition (105) is heated in the vessel (115) to a temperature sufficient to vaporize at least a portion of the at least one fatty alcohol such that a vapor (120) having a condensation temperature is formed. A paper or polymer substrate (110) is fed through rollers (125) into the vessel (115) containing the slip agent composition (105) comprising a fatty alcohol, whereby the substrate (110) is exposed to the vapor (120). The vapor (120) condenses and is deposited on the substrate (110) to form a coating. The coated paper substrate is then transferred using roller (130) for subsequent processing, which may include heating, drying, pressing, further coating, calendaring, etc. The vessel of FIG. 1 can be adapted for applying the slip agent composition to one side or both sides of the sheet. In addition, the vessel may be closed or open to the ambient air.

Figure 2:
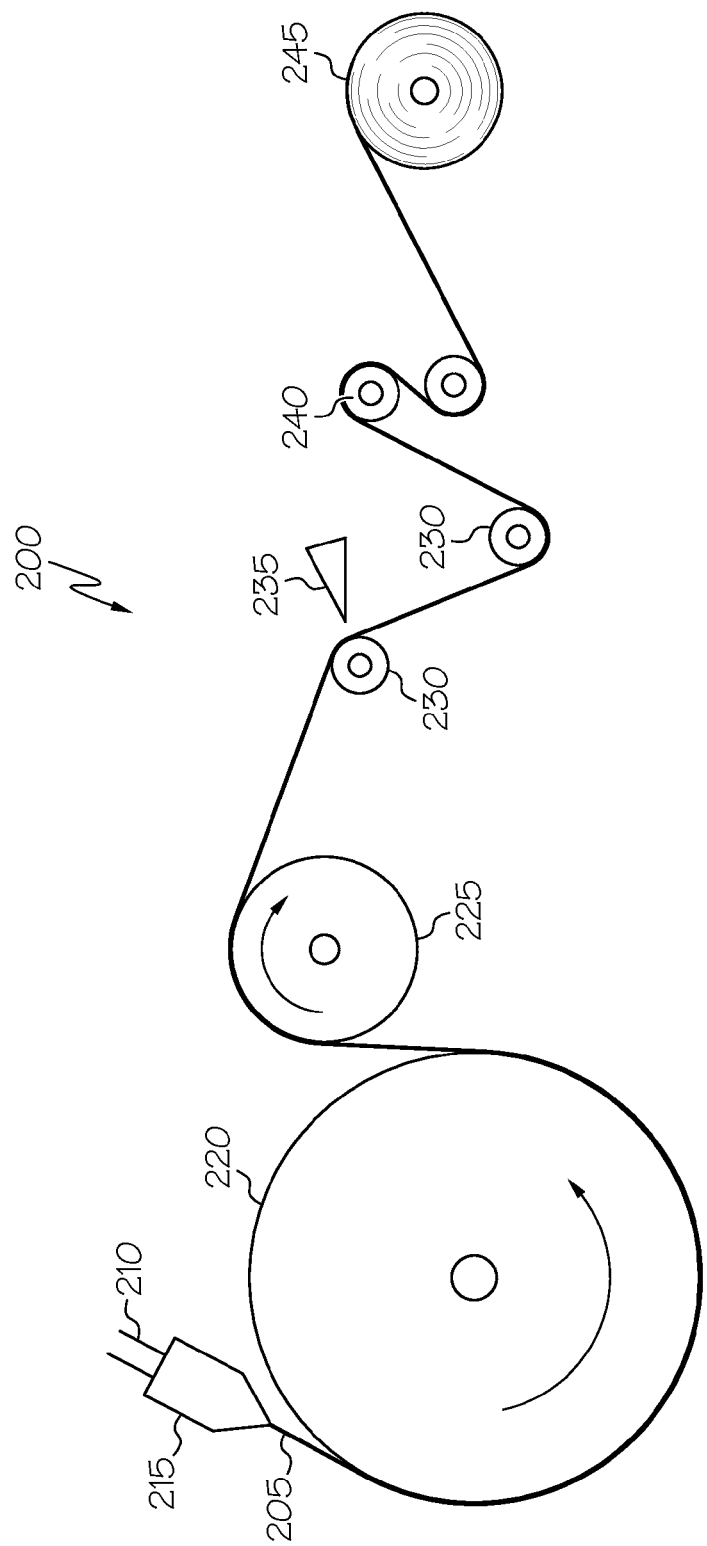
FIG. 2 schematically depicts a method for forming a polymeric film formulated with a fatty alcohol by cast film extrusion.

Referring to FIG. 2, a cast film process (200) for manufacturing a polymer film is schematically depicted. In this method, at least one polymer and a slip agent composition comprising at least one fatty alcohol are incorporated together (e.g., by mixing) to form a molten polymer mixture. The molten polymer mixture is introduced through a die inlet (210) into the cast film die (215), where the polymer mixture is extruded to form a thin film layer or web (205). The film (205) is cast onto a chilled casting roll (220) and guided over a stripping roll (225), which is used to remove or strip the film from the casting roll (220). The film (205) is then guided around idler rolls (230) and past the edge trim slitter (235), which is used to trim off the edge portions of the film (205) on each side. However, in embodiments shown and described herein, the edge trim slitter (235) may trim off edge portions from only one side of the film (205). The film (205) is then advanced over pull rolls (240). The film (205) is then advanced to and wound on a windup roll (245).

Figure 3:
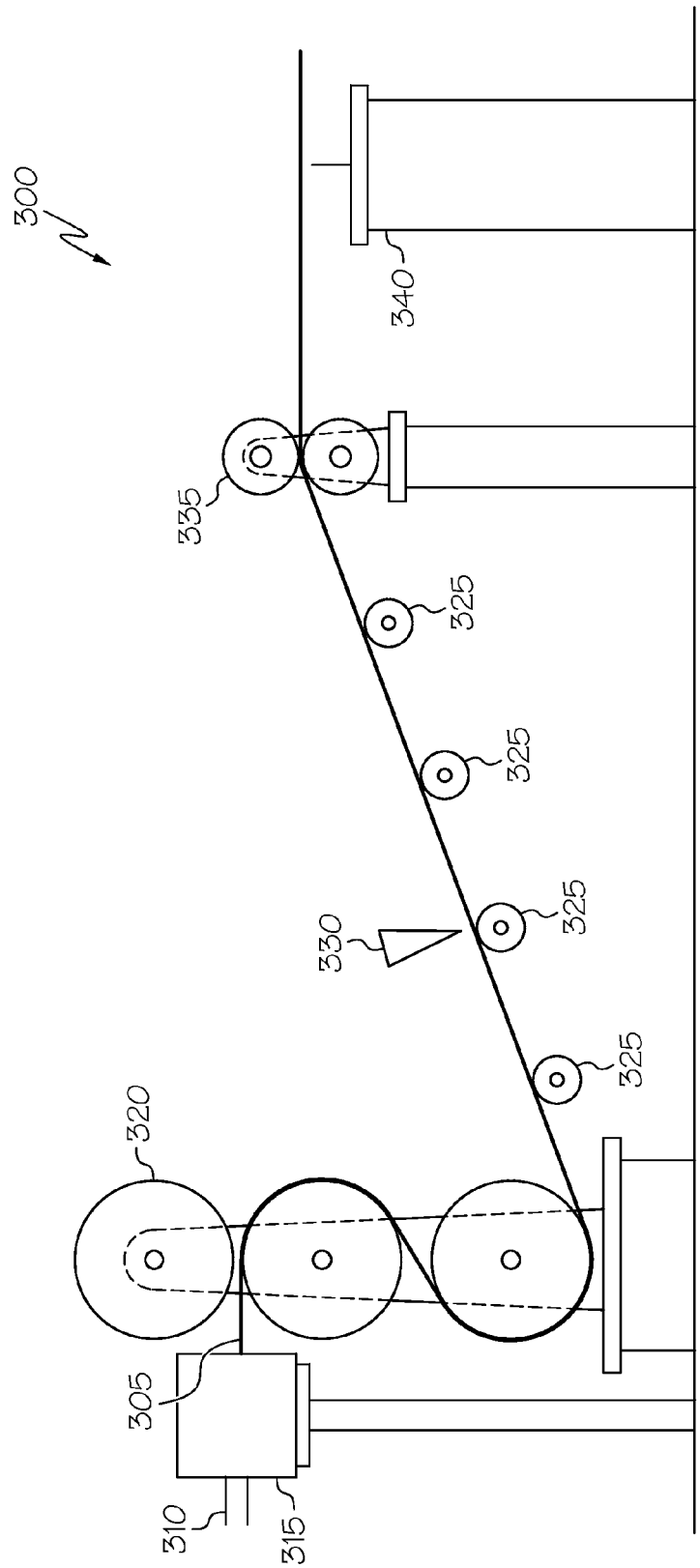
FIG. 3 schematically depicts a method for forming a polymeric film formulated with a fatty alcohol by plastic extrusion.

Referring to FIG. 3, a polymer sheet extrusion process (300) for manufacturing a polymer film is schematically depicted. At least one polymer and a slip agent composition comprising at least one fatty alcohol are incorporated together (e.g., by mixing) to form a molten polymer mixture. The molten polymer mixture is introduced through a die inlet (310) into the die (315) where the polymer mixture is extruded to form a polymer film layer or web (305). The film (305) is pulled through a three-roll finisher (320) and over four support rollers (325) using two pull rolls (335). An edge trim cutter (330) is positioned over one of the support rollers (325) to trim off the edge portions of the film (305) on each side. However, in embodiments shown and described herein, the edge trim cutter (330) may trim off edge portions from only one side of the film (305). The film (305) then passes over a saw or shear (340), which can be used for cutting or dividing the film (305) to the cut film (305) into sheets.

Figure 4:
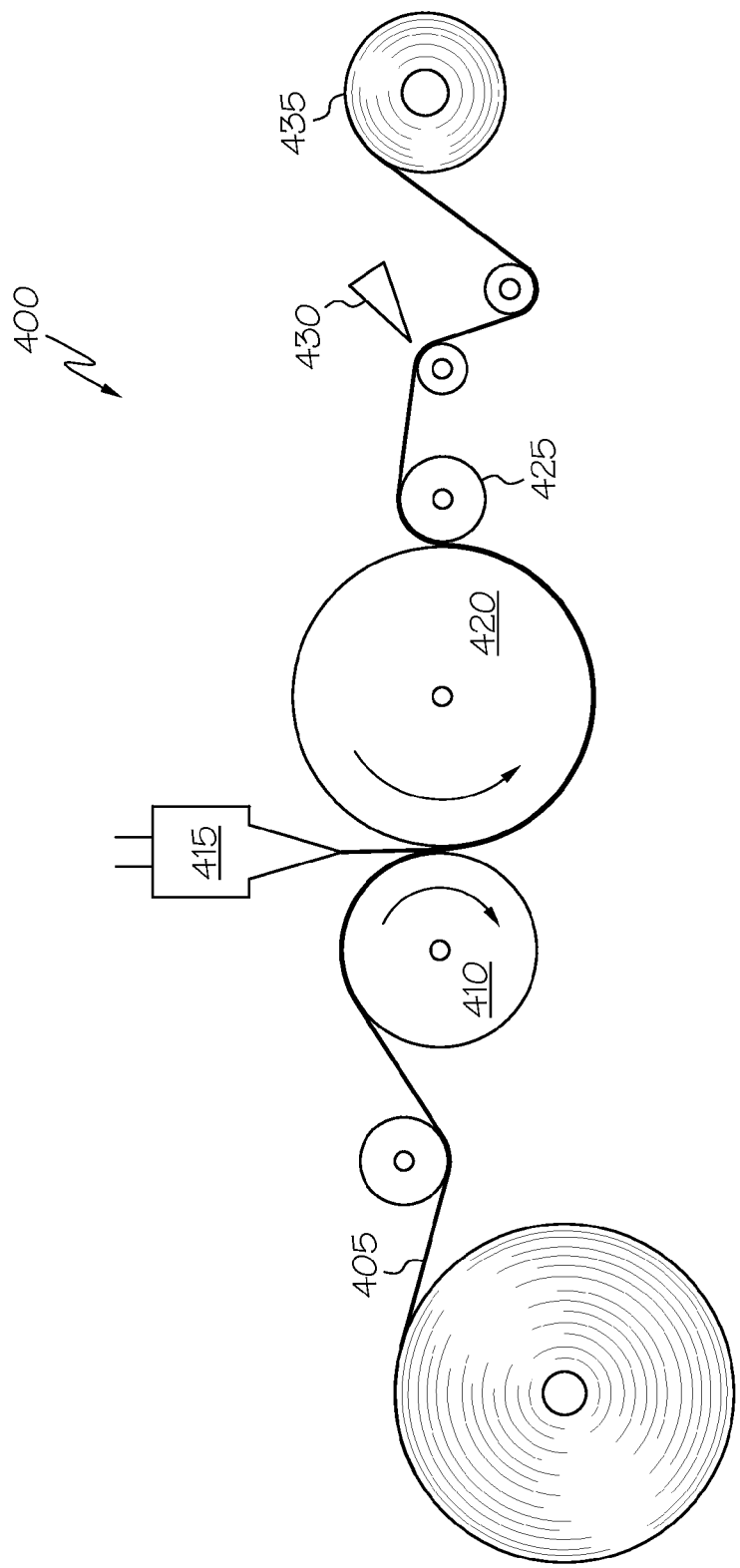
FIG. 4 schematically depicts a method for forming a polymeric film formulated with a fatty alcohol by extrusion casting on substrate.

Referring to FIG. 4, an extrusion casting on substrate process (400) for manufacturing a polymer film is schematically depicted. At least one polymer and a slip agent composition comprising at least one fatty alcohol are incorporated together (e.g., by mixing) to form a molten polymer mixture. A pre-formed paper or polymer substrate (405) is unwound and guided over a pressure roll (410), where the molten polymer mixture is introduced through die (415) and coated onto the substrate (405). The coated substrate (405) is contacted by the chill roll (420), where the coated substrate (405) is cooled. The substrate (405) is guided over a stripper roll (425), which is used to remove or strip the coated substrate from the chill roll (420). An edge trimmer (430) is positioned after the stripper roll (425) to trim off the edge portions of the substrate (405). However, in embodiments shown and described herein, the edge trimmer (430) may trim off edge portions from only one side of the substrate (405). The substrate (405) is then wound onto the windup roll (435).

Figure 5:
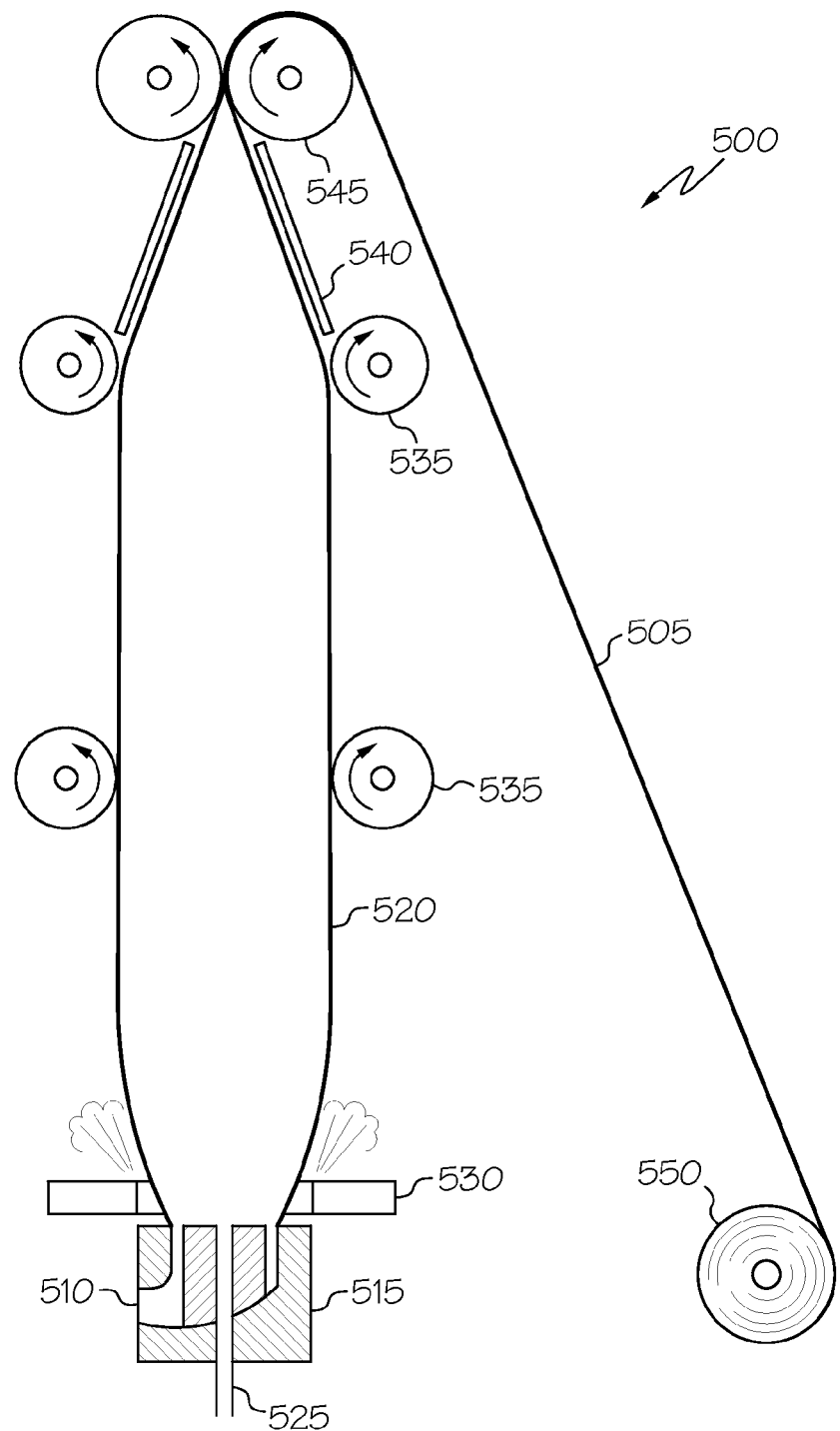
FIG. 5 schematically depicts a blown film extrusion method for forming a polymeric film formulated with a fatty alcohol.

Referring to FIG. 5, blown film extrusion process (500) for manufacturing a polymer film is schematically depicted. At least one polymer and a slip agent composition comprising at least one fatty alcohol are incorporated together (e.g., by mixing) to form a molten polymer mixture. The molten polymer mixture is introduced through the die inlet (510) into the blown film die (515), where the polymer mixture is extruded to ultimately form a thin film layer or web (505). The polymer mixture is blown into a plastic tube or bubble (520) and a flow of air is provided into the interior of the plastic tube (520) through an air inlet (525). The flow of air into the plastic tube (520) is controlled using a valve (not pictured). Air is also directed along the exterior of the plastic tube (520) from external air ring (530). Guide rolls (535) protect and guide the plastic tube (520) as it is pulled upward using pull rolls (545) through the collapsing frame (540). The collapsing frame (540) is configured to receive, collapse, and flatten the extruded film tube. The flattened tube (520) passes over pull rolls (545) and is wound onto the windup roll (550).

The protective polymer films or papers described herein may be used to protect a surface of a substrate, such as the surfaces of organic and inorganic substrates. In embodiments, the protective polymer films or papers described herein can be used for protecting hydrophilic surfaces, such as those comprising hydrophilic surface groups, e.g., OH groups. A number of glass, glass-ceramic, ceramic and crystalline materials are known to comprise surface —OH groups and therefore can be protected utilizing the protective polymer films or papers described herein. In embodiments, the protective polymer films or papers described herein can be used for protecting a surface of a glass substrate.

In general, a method for protecting a glass substrate may include providing a protective paper or film formulated with a slip agent composition comprising at least one fatty alcohol as described herein, and applying the protective paper or film onto a surface of a glass substrate. A composite glass package with a protected surface may comprise a glass substrate and a protective paper or film adhered to a surface of the glass substrate, wherein the protective paper or film is formulated with a slip agent composition comprising at least one fatty alcohol as described herein.

In embodiments, the glass substrate may initially be bare such that the glass substrate is substantially free of coatings. In embodiments, the glass substrate may have a coating layer formed thereon. The coating layer may be a fatty alcohol coating directly applied to a clean surface of the glass substrate. The fatty alcohol coating may be applied using any conventional manner, such as, for example, by spray coating, dip coating, flow coating, etc. In embodiments, the coating can be deposited during and/or before the glass substrate finishing/handling processes so as to aid in protecting the surface quality of the glass during such processes.

The method may further comprise transferring a portion of the slip agent composition to the surface of the glass substrate from the protective paper or film, and removing the protective paper or film from the surface of the glass substrate such that an amount of the slip agent composition remains on the surface of the glass substrate.

The transfer of a portion of the slip agent composition to the surface of the glass substrate may be dependent upon, for example, the amount of pressure being applied to the protective paper or film when the protective paper or film is in contact with the glass substrate, the amount of time the protective paper or film comprising the slip agent composition is in contact with the surface of the glass substrate, and whether heat is used to assist in the transfer of the slip agent composition to the glass substrate. In embodiments, the coating weight of the slip agent composition transferred to the surface of the glass substrate can vary, and in embodiments, can be, for example, from about 10 to about 1600 nanograms/cm$^2$, from about 10 to about 1000 nanograms/cm$^2$, from about 20 to about 750 nanograms/cm$^2$, from about 25 to about 500 nanograms/cm$^2$, and from about 50 to about 300 nanograms/cm$^2$, including intermediate values and ranges. If the coating weight is too high, for example, greater than 5000 nanograms/cm$^2$, the slip agent composition may be difficult to remove in a later cleaning and washing step. If the coating weight is too low, for example, less than 10 nanograms/cm$^2$, the slip agent composition may be insufficient to provide the desired defect protection and scratch resistance.

The slip agent composition transferred to the surface of the glass substrate has an adhesion strength sufficient to enable the slip agent composition to adhere to the surface of the glass substrate as a protective layer capable of surviving subsequent glass manufacturing processes, such as glass finishing and handling processes, while remaining easy to remove from the surface of the glass substrate when desired. Without being bound by theory, it is believed that based on the acid-base interaction of amides and alcohols on silica glass surfaces using the Fowkes & Drago method, larger interaction energies are expected between an amide and a silica glass surface (about 157 mJ/m$^2$) than between an alcohol and a silica glass surface (using ketone values of about 87 mJ/m$^2$). Therefore, it is believed that fatty amides have higher adhesion to glass substrates, making them difficult to remove from the glass surface, while fatty alcohols have lower adhesion, making them easier to remove from the glass surface.

The methods described herein may further comprise removing the slip agent composition from the surface of the glass. It should be noted that the removal of the coating can be done by the manufacturer of the glass or the glass can be shipped to the ultimate user, such as a manufacturer of liquid crystal display devices or the like, and the user can remove the coating from the glass. In embodiments, the glass substrate is washed and cleaned to remove the fatty alcohols, any residual glass particles, and other surface contaminants from the surface of the glass substrate. Washing may be performed using conventional commercial detergents suitable for cleaning glass surfaces. In embodiments, from about 0.1 to about 8 nanograms/cm$^2$, from about 0.5 to about 8 nanograms/cm$^2$, and from about 1 to about 5 nanograms/cm$^2$, including intermediate values and ranges, of slip agent composition can remain on the surface of the glass substrate following washing. In embodiments, less than about 8, 6, 5, 4, 3, 2, or 1 nanograms/cm$^2$ of slip agent composition can remain on the surface of the glass substrate following washing. Accordingly, the coatings containing fatty alcohols described herein can be readily removed from a glass substrate by washing.

Removal of the slip agent composition may occur before, during and/or after various glass manufacturing operations, such as, for example, finishing operations, handling operations, packaging and shipping operations, or the like. In embodiments, such as the handling of LCD glass substrates, the removal of the slip agent composition by washing occurs after the finishing operation.

Once the slip agent composition is removed, the glass substrate may exhibit a low defect count. A defect can include, but is not limited to, scratches on the surface of the glass, and/or particles or debris present on the surface of the glass. Without being bound by theory, it is believed that the fatty alcohols described herein reduce the frictional coefficient between particles and the glass surface, thereby protecting the glass surface from being scratched by the particles. It is also believed that the fatty alcohols described herein reduce the adhesion forces between particles and the glass surface, thereby reducing the number of particles that may bond to the glass surfaces with sufficient bonding strength to survive subsequent washing and cleaning Accordingly, in embodiments, when the slip agent composition is removed, the glass has a defect count of less than about 30 defects/cm$^2$. In embodiments, when the slip agent composition is removed, the glass has a defect count of less than about 25 defects/cm$^2$. In embodiments, when the slip agent composition is removed, the glass has a defect count of less than about 20 defects/cm$^2$. In embodiments, when the slip agent composition is removed, the glass has a defect count of less than about 10 defects/cm$^2$. In embodiments, when the slip agent composition is removed, the glass has a defect count of less than about 5 defects/cm$^2$. In embodiments, when the slip agent composition is removed, the glass may also have a percent change in defect count between the number of scratch defects/cm$^2$ before the performance of a scratch and the number of scratch defects/cm$^2$ after the performance of a scratch test as further described herein, of from about 0% to about 85%, from about 0.5% to about 50%, and from about 1% to about 33%. The percent change is calculated as follows:

$$\frac{|\text{After Scratch Defects/cm}^2 - \text{Before Scratch Defects/cm}^2|}{\text{Before Scratch Defects/cm}^2}$$

A low percent change can show that the slip agent composition provides substantially the same surface characteristics and defect levels to those of control untreated sheets held in a clean environment.

The surface protection polymer films and papers disclosed herein may be particularly useful when packaging glass substrates. Glass substrates may be packaged by providing a first glass substrate and a second glass substrate, positioning a protective paper or film formulated with a slip agent composition between the first glass substrate and second glass substrate, wherein the slip agent composition comprises at least one fatty alcohol as described herein, forming a stack having at least a portion of the protective paper or film disposed between and contacting the first glass substrate and the second glass substrate, and placing the stack in a container.

The protective paper or film can be adhered or not adhered to the first and/or second glass substrate. In embodiments, the protective paper or film may be loosely or strongly adhered to one or both of the first and second glass substrates in the stack. Adhesion can be done by hydrogen bonding, adhesives and/or electrostatics. In embodiments, the protective paper or film may be adhered to one side of the first or second glass substrate. After unpacking, the paper or film may be peeled off of the glass substrate.

The embodiments described herein may be further illustrated by the following non-limiting examples.

EXAMPLES

In all examples discussed below, the glass sheet samples were prepared from Eagle XG® LCD glass substrates made by Corning Incorporated, Corning, N.Y., U.S.A., using an overflow fusion down-draw process.

Example 1

Four polyethylene films were formulated and extruded using an extruder (Wayne "Yellow Jacket" line with 1.5" screw element) and a 6" film die. The film compositions primarily used a low melt flow polyethylene resin (Dow Chemical LDPE 621) having a melt flow index of 2.3. Master batches of fatty alcohols were compounded with a high melt flow polyethylene resin (Dow Chemical LDPE 722) having a melt flow index of 8.0. The master batches were mixed with the low melt flow polyethylene resin to formulate the polymer film compositions. Two fatty alcohols were used in the polyethylene film formulations. Octadecanol (99.5%) from Aldrich Chemical and docosanol (NACOL® 22-98) from Sasol Company.

The four prepared polymer films had the following formulation:
Film #1 contained 2000 ppm of octadecanol
Film #2 contained 3000 ppm of octadecanol
Film #3 contained 2000 ppm of docosanol
Film #4 contained 3000 ppm of docosanol The amount of fatty alcohol on the surface of the film was determined by gas chromatography/mass spectrometry (GC/MS). The film was washed with methanol for 15 minutes, and the fatty alcohols extracted using the methanol were quantified by GC/MS analysis. Table 1 contains the analysis results which show that the extracted solution contained fatty alcohols from the polymer films.

The amount of fatty alcohol that was transferred from the polymer film to a surface of a glass substrate was also determined. The fatty alcohol was transferred from the film to the glass surface by laminating both sides of clean Eagle XG® (5"×5") glass sheets with the prepared polymer films. The laminated glass sheets were aged and heat formulated at 60° C. under a weight of 2 kg for 2 days to simulate a glass packing condition. After heat formulating the laminated glass sheets, the sheets were stored at room temperature for 10 days prior to surface chemical analysis. The polymer films were then removed from the glass sheets, and the glass sheets were washed with methanol for 15 minutes. The fatty alcohols extracted using the methanol were quantified using GC/MS analysis. Table 1 contains the GC/MS analysis results, which show the amount of fatty alcohols transferred to the glass surface from the polymer films.

TABLE 1

Low Density Polyethylene Films with Fatty Alcohol Additives:
Quantity of Fatty Alcohol On Film Surfaces and
Transferred to Glass Surface

| Film Sample ID | Amount of Fatty Alcohol in Film Formulation | Alcohol ID | Film Surface Extract Quantity (microgram/cm$^2$) | Glass Surface Extract Quantity (microgram/cm$^2$) |
| --- | --- | --- | --- | --- |
| #1 | 2000 ppm | octadecanol | 0.54 | 0.081 |
| #2 | 3000 ppm | octadecanol | 1.07 | 0.188 |
| #3 | 2000 ppm | docosanol | 0.57 | 0.066 |
| #4 | 3000 ppm | docosanol | 0.74 | 0.178 |

To determine whether the amount of fatty alcohol present on the glass surface was sufficient to adequately protect the glass surface, these amounts were compared with an octadecanol control known to provide adequate protection of the glass sheet. In preparing the control, octadecanol was vapor deposited on bare Eagle XG® glass sheets for 10 seconds at 90° C. The vapor deposited octadecanol glass sheet was washed to extract the fatty alcohols, and the extracted alcohols were quantified using GC/MS analysis. The amount of fatty alcohols present on the vapor deposited octadecanol glass surface was determined to be 151 nanograms/cm$^2$.

It was found that the amount of octadecanol and docosanol transferred to the glass surface by the polymer films in Samples 1-4 was comparable to that amount of octadecanol vapor deposited on the glass surface at 90° C. for 10 seconds, and therefore, the octadecanol transferred from polymer films should sufficiently protect the glass surface during subsequent glass handling and/or processing.

Example 2

Solid octadecanol (Sigma Aldrich, Catalog #74723, 99% purity) was heated in a glass Petri dish to a temperature of 90° C., where the octadecanol melted to form a liquid covering the full bottom surface of the dish and a vapor was also produced in the air immediately above the Petri dish. A piece of paper (WR139 from Thilmany, Wis., U.S.A.) was then placed over the dish at a distance of about 4 cm from the surface of the melt of the alcohol where it was maintained for a period of time of either 10 seconds, 30 seconds, 1 minute and 5 minutes, respectively, and then removed. The temperature of the alcohol was measured at the surface of the melt.

Bare Eagle XG® was placed in contact with uncoated WR139, octadecanol coated WR139 at 90° C. for 10 seconds, octadecanol coated WR139 at 90° C. for 30 seconds, octadecanol coated WR139 at 90° C. for 1 minute, octadecanol coated WR139 at 90° C. for 5 minutes, and a erucamide coated glassine paper (CWR239 provided by Thilmany, Wis., U.S.A.). The papers were contacted with the bare Eagle XG® glass under simulated storage conditions for one day (24 hours) using a 4.77 kg steel block. The papers were then removed, and the coated glass was subjected to a scratching test.

Scratch Test Method

Scratching took place by contacting a 380 g stainless steel bar wrapped with uncoated WR139 paper with the surface of the glass sheet sample to be tested. The stainless steel bar, without an external force normal to the glass surface other than gravity exerted thereto, was then moved back and forth relative to the glass sheet surface at a speed of 100 mm/s for 10 times (or 5 times back and 5 times forth). The glass sheet sample was then cleaned using a 4% Semiclean KG solution (Yokohama Oils and Fats Industry Co., Ltd., Japan). The glass sheet samples were measured for defect count PC1 using an optical defect detection system available from Accu_Fab Systems, U.S.A. prior to contacting the glass surface with the papers and performing the scratch test. The glass sheet samples were also measured for defect count PC2 using the optical defect detection system after contacting the glass surface with the papers and performing the scratch test. An uncoated glass sheet sample was used as a control. A glass sheet sample protected with a plastic film (Visqueen®) was also used as another control. The Visqueen® film was peeled from the glass and subjected to scratching as above, washed and the defect count determined.

Figure 6:
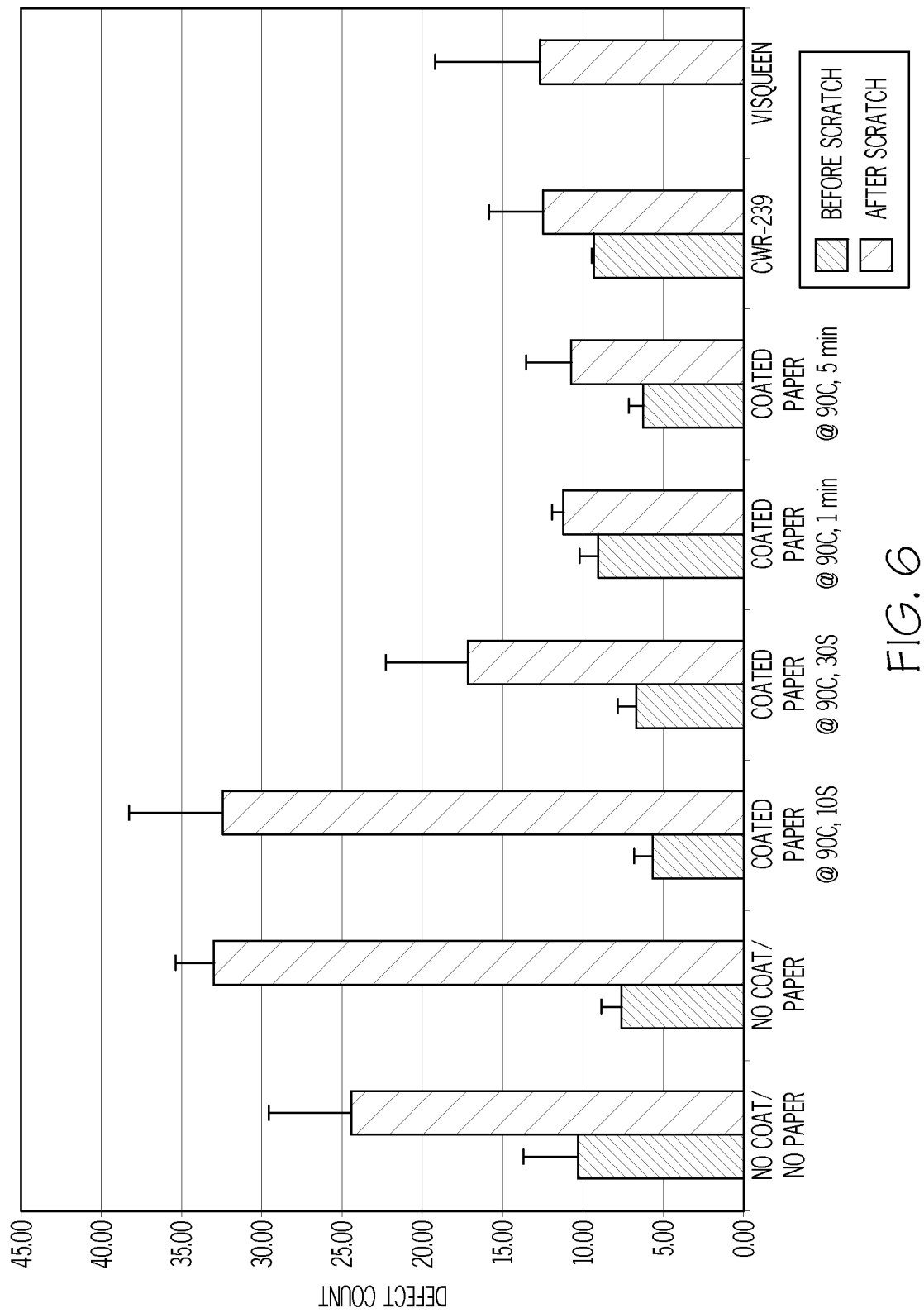
FIG. 6 graphically depicts the defect count before and after scratching for bare glass in contact with fatty alcohol coated paper.

FIG. 6 graphically depicts the defect count test results. Significant defect count increases were observed for bare glass, glass in contact with uncoated WR139, glass in contact with octadecanol coated WR139 at 90° C. for 10 seconds, and octadecanol coated WR139 at 90° C. for 30 seconds. The defect counts for octadecanol coated WR139 at 90° C. for 1 minute, octadecanol coated WR139 at 90° C. for 5 minutes, erucamide coated glassine paper (CWR239 provided by Thilmany, Wis., U.S.A.), and Visqueen® shows little variation in defect count before and after scratch testing. Additionally, the octadecanol coated WR139 at 90° C. for 1 minute and the octadecanol coated WR139 at 90° C. for 5 minutes provided an comparable level of protection as the Visqueen® control.

Example 3

Solid octadecanol (Sigma Aldrich, Catalog #74723, 99% purity) was heated in a glass Petri dish, where the octadecanol melted to form a liquid covering the full bottom surface of the dish and a vapor was also produced in the air immediately above the Petri dish. A piece of paper (WR139 from Thilmany, Wis., U.S.A.) was then placed over the dish at a distance of about 4 cm from the surface of the melt of the alcohol where it is maintained at 90° C. for 1 minute, 90° C. for 5 minutes, 100° C. for 1 minute, 100° C. for 5 minutes, and then removed. Glass sheet samples having clean surfaces on both sides were also placed over the Petri dish at a distance of about 1 cm from the surface of the melt of the alcohol, where they were maintained at 90° C. for 10 seconds. The temperature of the alcohol was measured at the surface of the melt.

Coated Eagle XG® was placed in contact with uncoated WR139, octadecanol coated WR139 at 90° C. for 1 minute, octadecanol coated WR139 at 90° C. for 5 minutes, octadecanol coated WR139 at 100° C. for 1 minute, octadecanol coated WR139 at 100° C. for 5 minutes, and a erucamide coated glassine paper (CWR239 provided by Thilmany, Wis., U.S.A.). The papers were contacted with the bare Eagle XG® glass under simulated storage conditions for one day (24 hours) using a 4.77 kg steel block. The papers were then removed, and the coated glass was subjected to a scratching test.

As in Example 2, the glass sheet samples were subjected to scratching, washed, and measured for defect count prior to contacting the glass surface with the papers and after contacting the glass surface with the papers. A coated glass sheet sample having no contact with any paper was used as a control. A coated glass sheet sample protected with a plastic film (Visqueen®) was used as another control. The Visqueen® film was peeled from the glass and subjected to scratching as above, washed and the defect count determined.

Figure 7:
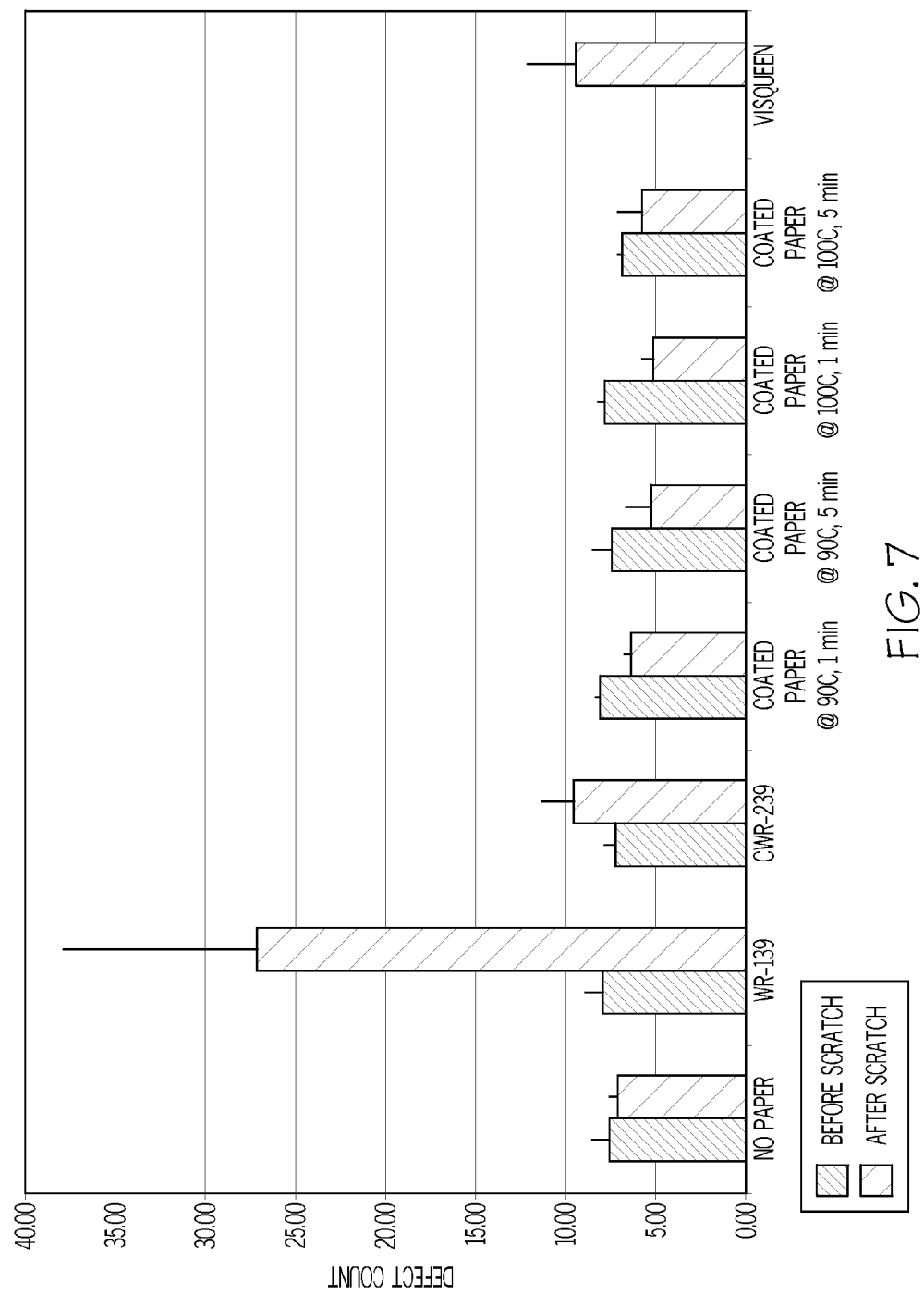
FIG. 7 graphically depicts the defect count before and after scratching for coated glass in contact with fatty alcohol coated paper.

FIG. 7 graphically depicts the defect count test results. Significant defect count increases were observed for glass in contact with uncoated WR139. The defect counts for coated glass having no contact with paper, octadecanol coated WR139 at 90° C. for 1 minute, octadecanol coated WR139 at 90° C. for 5 minutes, octadecanol coated WR139 at 100° C. for 1 minute, octadecanol coated WR139 at 100° C. for 5 minutes, erucamide coated glassine paper, and Visqueen® showed little variation in defect count before and after scratch testing. Additionally, the octadecanol coated WR139 provided a comparable level of protection as the controls, which exhibited almost no loss of scratch protection.

Example 4

The washability of Eagle XG® glass was determined where fatty alcohol was transferred from WR139 to a surface of a glass substrate. Solid octadecanol (Sigma Aldrich, Catalog #74723, 99% purity) was heated in a glass Petri dish to a temperature of 90° C., where the octadecanol melted to form a liquid covering the full bottom surface of the dish and a vapor was also produced in the air immediately above the Petri dish. A piece of paper (WR139 from Thilmany, Wis., U.S.A.) was then placed over the dish at a distance of about 4 cm from the surface of the melt of the alcohol where it is maintained for a period of time of either 10 seconds, 30 seconds, 1 minute and 5 minutes, respectively, and then removed. The temperature of the alcohol was measured at the surface of the melt.

Bare Eagle XG® glass samples (5"×5") were placed in contact with uncoated WR139, octadecanol coated WR139 at 90° C. for 10 seconds, octadecanol coated WR139 at 90° C. for 30 seconds, octadecanol coated WR139 at 90° C. for 1 minute, and octadecanol coated WR139 at 90° C. for 5 minutes. The papers were contacted with the bare Eagle XG® glass and pressed for one day (24 hours) using a horizontal stack method with a 4.77 kg steel block. The papers were then removed, and the glass sheets were washed with 4% Semiclean KG solution. The glass sheet samples were then exposed to chloroform, and dried to expose the presence of octadecanol. The amount of octadecanol (after washing) present on the glass surface was quantified using GC/MS analysis. The chloroform was used as a control. The amount of octadecanol was also measured for a glass sheet sample having no contact with any paper and unwashed using the 4% Semiclean KG solution, and a glass sheet sample having no contact with any paper, but washed using the 4% Semiclean KG solution was used as a control. Shown in Table 3 are the GC/MS analysis results, which show the octadecanol transferred to the glass surface was easily washed from the glass surface leaving octadecanol levels below detection behind.

TABLE 3

Washability Results of Bare Eagle XG ®.

| Sample No. | Chloroform solvent | Sample ID | | | Octadecanol Amount (micrograms/ 5" × 5" slide) None detected |
|---|---|---|---|---|---|
| 1 | EXG ® | no paper, no wash | | | <2 |
| 2 | EXG ® | no paper, no wash | | | <2 |
| 3 | EXG ® | no paper, wash | | | <2 |
| 4 | EXG ® | no paper, wash | | | <2 |
| 5 | EXG ® | Bare WR139 | | | <2 |
| 6 | EXG ® | Bare WR139 | | | <2 |
| 7 | EXG ® | WR139 | octadecanol coated | 90° C./10 s | <2 |
| 8 | EXG ® | WR139 | octadecanol coated | 90° C./10 s | <2 |
| 9 | EXG ® | WR139 | octadecanol coated | 90° C./30 s | <2 |
| 10 | EXG ® | WR139 | octadecanol coated | 90° C./30 s | <2 |
| 11 | EXG ® | WR139 | octadecanol coated | 90° C./1 min | <2 |
| 12 | EXG ® | WR139 | octadecanol coated | 90° C./1 min | <2 |
| 13 | EXG ® | WR139 | octadecanol coated | 90° C./5 min | <2 |
| 14 | EXG ® | WR139 | octadecanol coated | 90° C./5 min | <2 |

Example 5

The amount of octadecanol transferred from octadecanol coated WR139 to bare Eagle XG® glass was determined. Solid octadecanol (Sigma Aldrich, Catalog #74723, 99% purity) was heated in a glass Petri dish to a temperature of 90° C., where the octadecanol melted to form a liquid covering the full bottom surface of the dish and a vapor was also produced in the air immediately above the Petri dish. A piece of paper (WR139 from Thilmany, Wis., U.S.A.) was then placed over the dish at a distance of about 4 cm from the surface of the melt of the alcohol where it was maintained for a period of time of either 30 seconds, 1 minute or 5 minutes, respectively, and then removed. The temperature of the alcohol was measured at the surface of the melt.

Bare Eagle XG® glass samples (5"×5") were placed in contact with uncoated WR139, octadecanol coated WR139 at 90° C. for 30 seconds, octadecanol coated WR139 at 90° C. for 1 minute, and octadecanol coated WR139 at 90° C. for 5 minutes. The papers were contacted with the bare Eagle XG® glass and pressed for one day (24 hours) using a horizontal stack method with a 4.77 kg steel block. The papers were then removed, and the glass sheets were then washed with chloroform. The octadecanol amounts extracted using the chloroform were quantified using GC/MS analysis. Table 4 contains the GC/MS analysis results, which show the amount of octadecanol transferred to the glass surface from the coated papers.

TABLE 4

Quantity of Octadecanol Transferred to Eagle XG ® Glass Surface From Coated WR139.

| Sample No. | Sample ID | | | Octadecanol (micrograms/ 5" × 5" slide) |
|---|---|---|---|---|
| 1 | Bare WR139 | | | <2 |
| 2 | Bare WR139 | | | 3.81 |
| 3 | WR139 | octadecanol coated | 90° C./30 s | 26.92 |
| 4 | WR139 | octadecanol coated | 90° C./30 s | 33.49 |
| 5 | WR139 | octadecanol coated | 90° C./1 min | 36.19 |
| 6 | WR139 | octadecanol coated | 90° C./1 min | 49.01 |
| 7 | WR139 | octadecanol coated | 90° C./5 min | 113.28 |
| 8 | WR139 | octadecanol coated | 90° C./5 min | 116.48 |

Example 6

The amount of adhesion force reduction for octadecanol coated EXG® and octadecanol coated EXG® after contact with WR139 was measured. The glass samples were coated using vapor deposition at 90° C. for 10 seconds. WR139 was used to contact the coated glass samples for one hour (which is similar to no contact) and for 17 hours. The coated glass sheet sample surfaces were then measured by AFM for the surface topography and adhesion force. The measuring tip of the AFM contacted the surfaces of the glass samples and the force of retraction was measured as well as the number of times that force of retraction was observed.

Figure 8:
FIG. 8 depicts a force adhesion map as measured by atomic force microscope (AFM) and histogram of a surface area of a glass sheet after one hour of contact with fatty alcohol coated paper.
Figure 8:
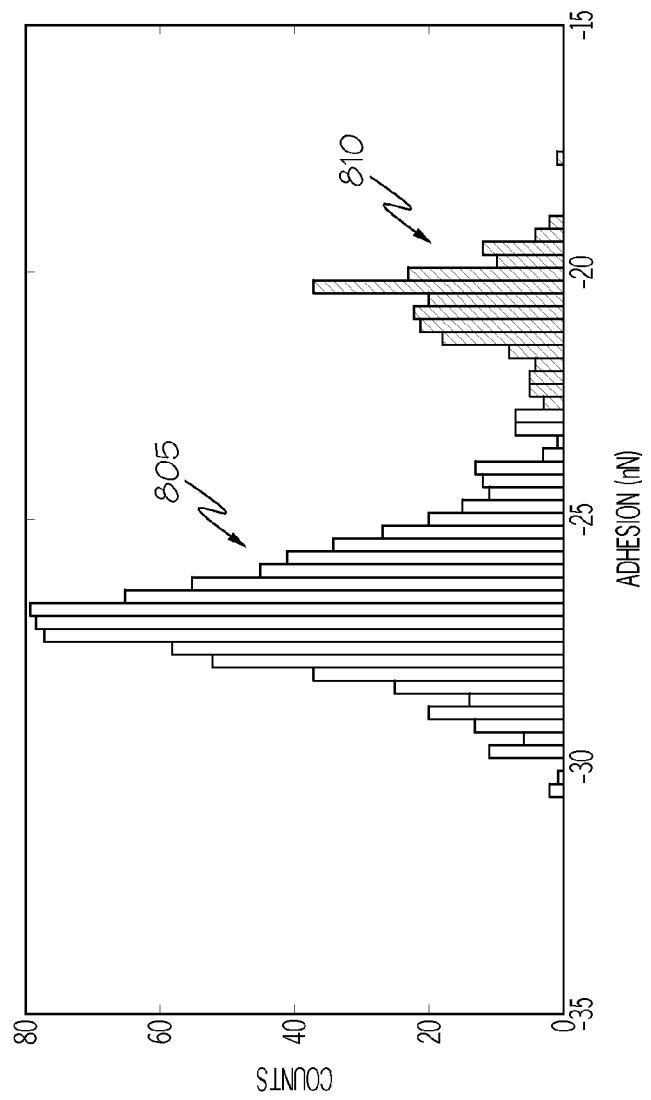

FIG. 8 shows on the right a surface force map image captured by AFM on a 2 micrometers×2 micrometers scale of a surface of a glass sheet sample made of Eagle XG® having octadecanol deposited thereon at 90° C. for 10 seconds. Uncoated WR139 paper was used to contact the glass sheet sample for one hour, which is similar to octadecanol coated EXG® have no contact with paper. In this image, the lighter areas are those bearing lower or no amounts of octadecanol coating, and the darker areas bear relatively higher amounts of octadecanol coating, and the darkest areas are believed to be essentially octadecanol because the surface adhesion force as measured in these areas by AFM is substantially less than that of a bare glass sheet surface that had not been exposed to octadecanol vapor. The left histogram of FIG. 8 shows the distribution of force measurements of the surface force map image. The histogram indicates that lower force is required to retract the measuring tip of the AFM when the measuring tip is in contact with octadecanol coated EXG® as compared to bare glass.

Figure 9:
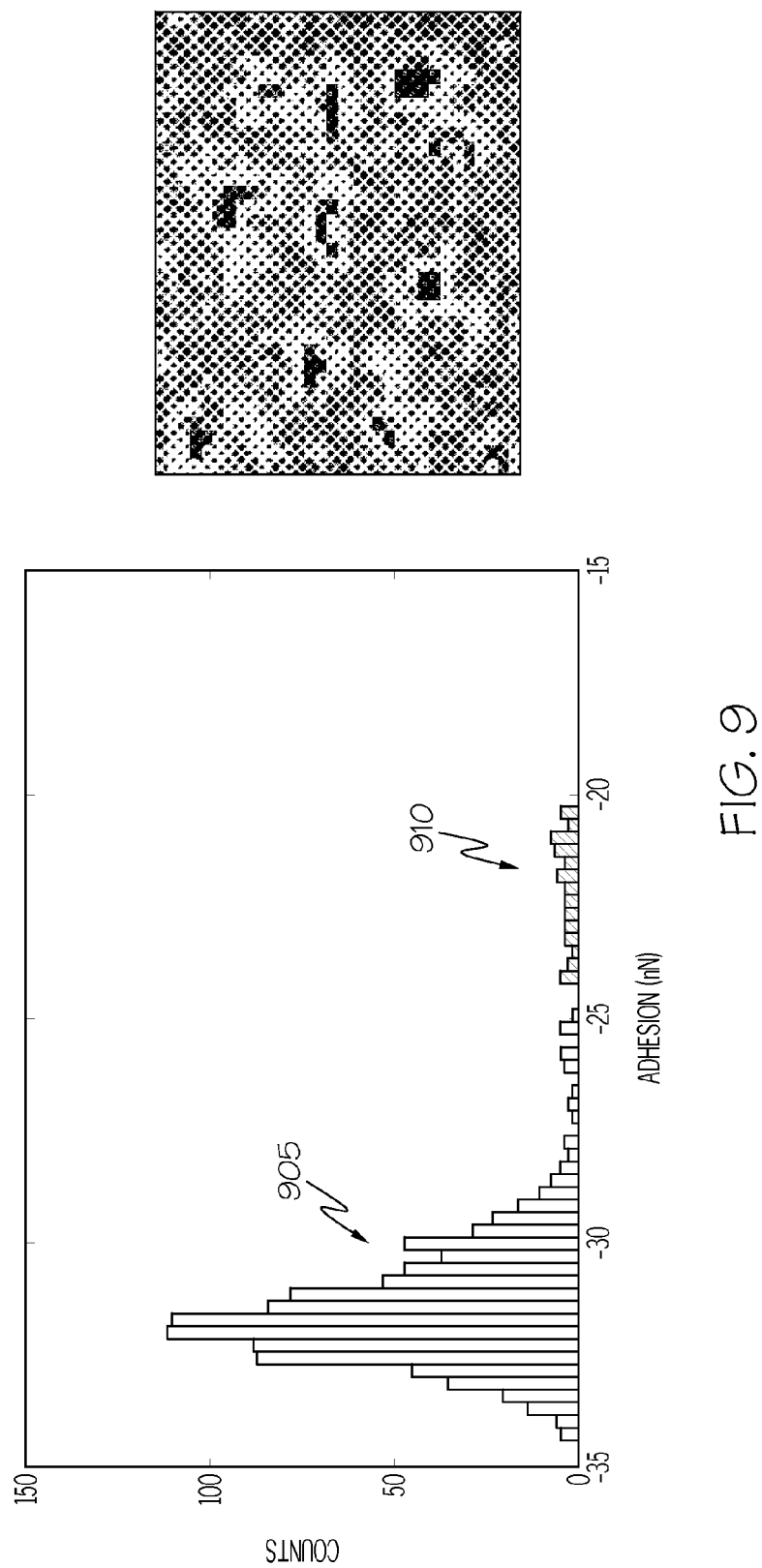
FIG. 9 depicts a force adhesion map as measured by atomic force microscope (AFM) and histogram of a surface area of a glass sheet after seventeen hours of contact with fatty alcohol coated paper.

FIG. 9 shows on the right a surface force map image captured by AFM on a 2 micrometers×2 micrometers scale of a surface of a glass sheet sample made of Eagle XG® having octadecanol deposited thereon at 90° C. for 10 seconds. WR139 paper was used to contact the glass sheet sample for seventeen hours. In this image, the lighter areas are those bearing lower or no amounts of octadecanol coating, and the darker areas bear relatively higher amounts of octadecanol coating, and the darkest areas are believed to be essentially octadecanol because the surface adhesion force as measured in these areas by AFM is substantially less than that of a bare glass sheet surface that had not been exposed to octadecanol vapor. More light areas can be seen as compared to the force map image captured in FIG. 8. FIG. 9 further shows on the left a histogram showing the distribution of adhesion force measurements of the surface force map image. Similar to FIG. 8, the histogram indicates that lower force is required to retract the measuring tip of the AFM when the measuring tip is in contact with octadecanol coated EXG® as compared to bare glass.

Example 7

Adhesion force measurements were compared for an ambient-exposed EXG® glass sample, a freshly washed EXG® glass sample, and an EXG® glass sample that had octadecanol transferred to its surface from WR139 paper coated with octadecanol at 90° C. for 1 minute. Solid octadecanol (Sigma Aldrich, Catalog #74723, 99% purity) was heated in a glass Petri dish to a temperature of 90° C., where the octadecanol melted to form a liquid covering the full bottom surface of the dish and a vapor was also produced in the air immediately above the Petri dish. A piece of paper (WR139 from Thilmany, Wis., U.S.A.) was then placed over the dish at a distance of about 4 cm from the surface of the melt of the alcohol where it was maintained for a period of 1 minute, and then removed. The temperature of the alcohol was measured at the surface of the melt.

Figure 10:
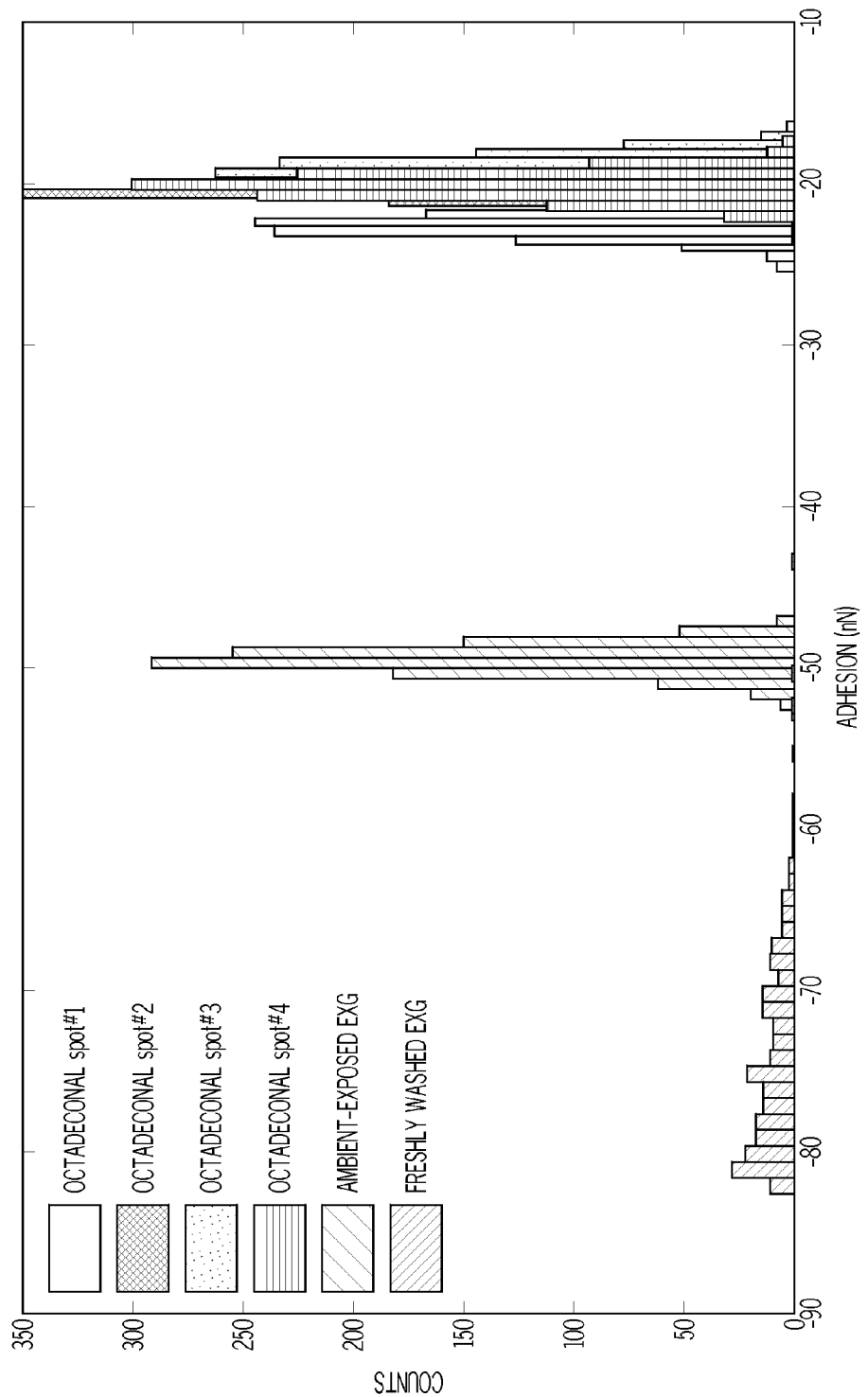
FIG. 10 graphically depicts a distribution of adhesion force as measured by atomic force microscope (AFM) of a glass sheet coated by paper transfer.

A Bare Eagle XG® glass sample was placed in contact with the octadecanol coated WR139 and pressed for one day using a 4.77 kg steel block. The papers were then removed and the glass sample was measured as is. Adhesion force measurements were made for several octadecanol spots on a glass sample after contact with the coated WR139 paper. Adhesion force measurements were also made on an uncoated glass sample that was exposed to ambient air and an uncoated glass sample that was freshly washed. FIG. 10 shows a histogram of the distribution of adhesion force measurements for the glass sheet samples. The histogram indicates that lower force is required to retract the measuring tip of the AFM when the measuring tip is in contact with octadecanol coated EXG® as compared to glass exposed to ambient air or glass that is freshly washed.

Example 8

Solid octadecanol (Sigma Aldrich, Catalog #74723, 99% purity) was heated in a glass Petri dish to a temperature of 90° C., where the octadecanol melted to form a liquid covering the full bottom surface of the dish and a vapor was also produced in the air immediately above the Petri dish. To prepare a octadecanol coated paper, a piece of paper (WR139 from Thilmany, Wis., U.S.A.) was then placed over the dish at a distance of about 4 cm from the surface of the melt of the alcohol where it was maintained for a period of 1 minute and then removed. The temperature of the alcohol was measured at the surface of the melt. A Bare Eagle XG® glass sample was placed in contact with the octadecanol coated WR139 and pressed for one day using a 4.77 kg steel block. The paper was then removed.

To prepare an octadecanol coated glass, a Bare Eagle XG® glass sample having clean surfaces on both sides was placed over the petri dish at a distance of about 1 cm from the surface of the melt of the alcohol where it is maintained for a period of 10 seconds, and then removed.

Figure 11:
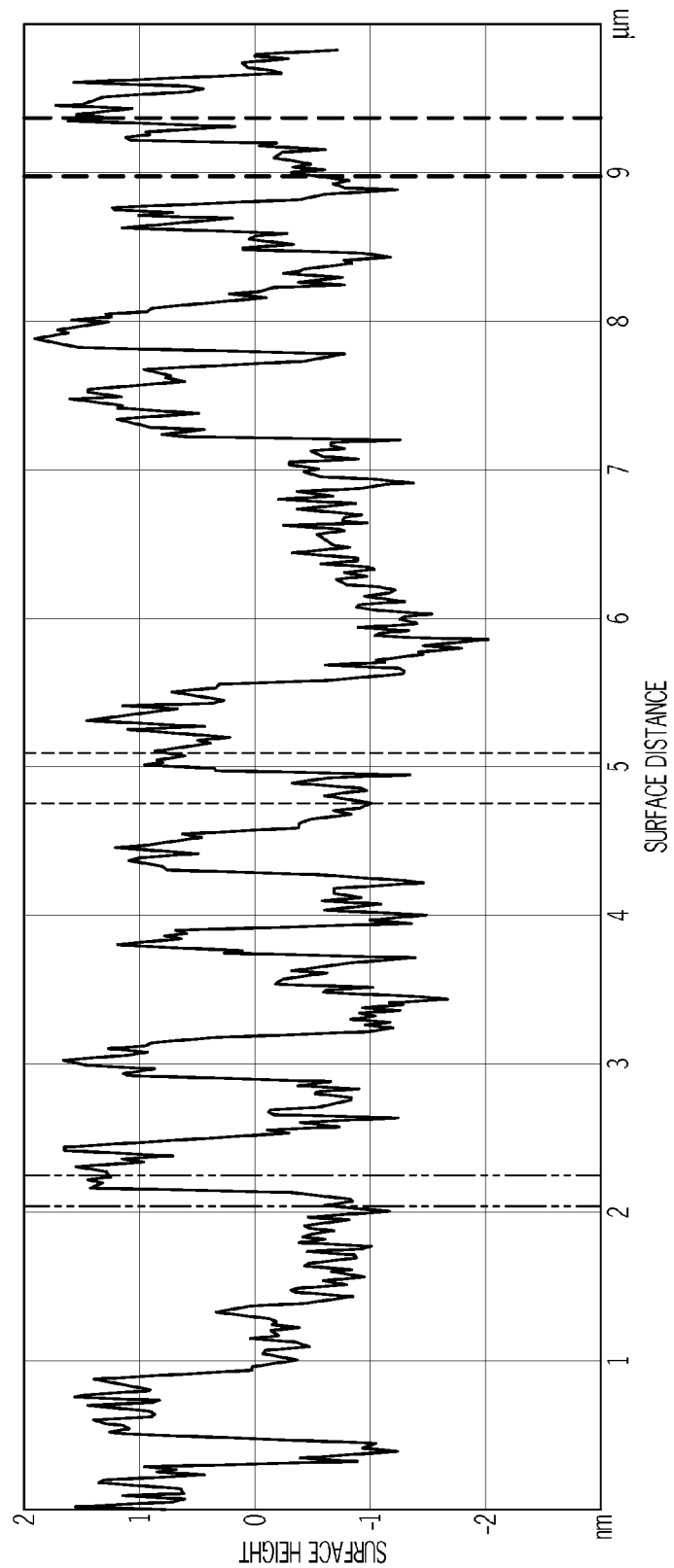
FIG. 11 graphically depicts the coating morphology of a fatty alcohol applied directly to a glass substrate.
Figure 12:
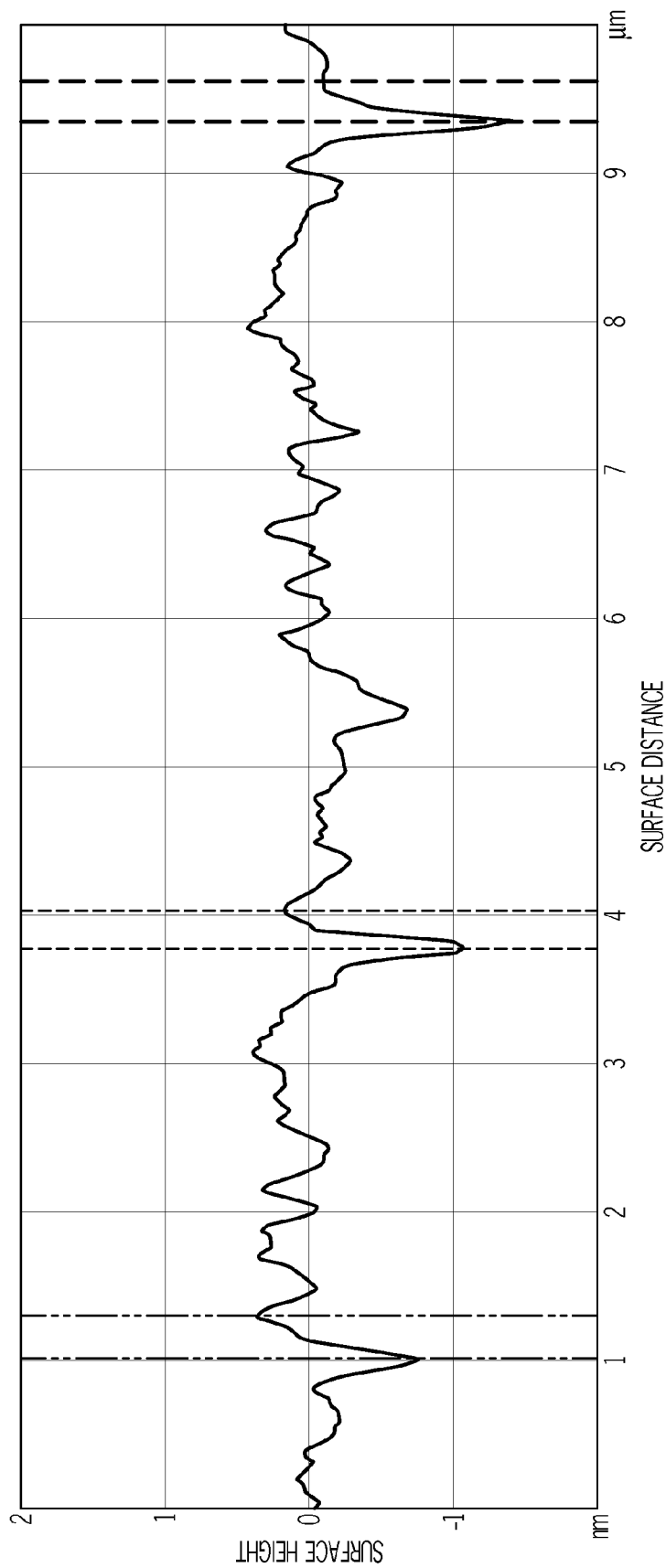
FIG. 12 graphically depicts the coating morphology of a fatty alcohol transferred to a glass substrate.

FIGS. 11 and 12 illustrate the difference in coating morphology between direct deposition of octadecanol onto EXG® for 10 seconds at 90° C. (FIG. 11) and direct deposition of octadecanol onto WR139 for 1 minute and 90° C. with subsequent transfer to EXG® (FIG. 12). While both scenarios provided good scratch protection, FIGS. 11 and 12 illustrate that the morphology of the coating is quite different.

FIGS. 11 and 12 show the surface roughness captured by AFM on a 10 micrometers×10 micrometers scale of a surface of a glass sheet sample. The horizontal axis represents distance from edge to edge of the measured area; and the vertical axis shows the measured surface height relative to a reference plane. FIG. 11 shows that vapor deposition of octadecanol directly on glass resulted in mounds of octadecanol about 2 nm high. FIG. 12 shows that transfer of octadecanol from WR139 paper to the glass surface results in mounds of octadecanol about 1 nm high. Thus, where octadecanol is transferred to the glass surface using WR139 paper, the coating appears to be more uniform and thinner than direct deposition, while still providing good scratch protection.

Aspects of the subject matter described herein relate to methods of protecting a glass substrate. The methods may comprise contacting a protective film or paper and at least one surface of a glass substrate, wherein the protective film or paper includes a slip agent composition comprising at least one fatty alcohol having the formula R—OH, wherein R is a saturated or unsaturated, linear or branched aliphatic chain containing 12 to 30 carbon atoms. In aspects described herein, the methods may further comprise transferring a portion of the slip agent composition from the protective film or paper to the surface of the glass substrate, and removing the protective film or paper from the surface of the glass substrate such that an amount of the slip agent composition remains on the surface of the glass substrate.

Aspects of the subject matter described herein also relate to methods for temporary protection of a glass substrate. The methods may comprise contacting a protective film or paper having a slip agent composition and at least one surface of a glass substrate, the slip agent composition comprising at least one fatty alcohol having the formula R—OH, wherein R is a saturated or unsaturated, linear or branched aliphatic chain containing 12 to 30 carbon atoms, transferring a portion of the slip agent composition from the protective film or paper to the surface of the glass substrate, and removing the protective film or paper from the surface of the glass substrate such that an amount of the slip agent composition remains on the surface of the glass substrate.

Aspects of the subject matter described herein also relate to composite glass packages. The composite glass packages may comprise a glass substrate, and a protective paper or film adhered to a surface of the glass substrate, wherein the protective paper or film includes a slip agent composition comprising at least one fatty alcohol having the formula R—OH, wherein R is a saturated or unsaturated, linear or branched aliphatic chain having 12 to 30 carbon atoms.

In aspects described herein, the slip agent composition may comprise from about 75 to 100 wt. % of the at least one fatty alcohol. In an aspect of the disclosure, R is a saturated, linear aliphatic chain containing 12 to 26 carbon atoms. In aspects described herein, the at least one fatty alcohol is lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, linoleyl alcohol, arachidyl alcohol, behenyl alcohol, erucyl alcohol, or combinations thereof. In aspects described herein, the at least one fatty alcohol is stearyl alcohol. In aspects described herein, the slip agent composition may comprise from about 75 to 100 wt. % of the at least one fatty alcohol, and R may be a saturated, linear aliphatic chain containing 12 to 26 carbon atoms. In aspects described herein, the slip agent composition comprises from about 75 to 100 wt. % of the at least one fatty alcohol, and the at least one fatty alcohol is lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, linoleyl alcohol, arachidyl alcohol, behenyl alcohol, erucyl alcohol, or combinations thereof. In aspects described herein, the slip agent composition comprises from about 75 to 100 wt. % of the at least one fatty alcohol, and the at least one fatty alcohol is stearyl alcohol.

In aspects described herein, the protective film or paper includes at least about 200 nanograms/cm$^2$ of the slip agent composition. In aspects described herein, the protective film or paper comprises glassine, Kraft paper, parchment paper, recycled paper, cellulosic paper, polyolefins, low density polyethylene, polyethylene film, ethylene-acrylic acid (EAA) copolymers, ethylene-vinyl acetate (EVA) copolymers, nylon polymers, polyethylene terephtalate polymers, polyvinyl chloride polymers, polypropylene, or combinations thereof.

In aspects described herein, the amount of slip agent composition remaining on the surface of the glass substrate is sufficient for the slip agent composition to adhere to the surface of the glass substrate and act as a protective layer, and to be removed from the surface of the glass substrate by washing. In aspects described herein, the amount of the slip agent composition remaining on the surface of the glass substrate is from about 10 nanogram/cm$^2$ to about 1600 nanogram/cm$^2$.

In aspects described herein, the methods may further comprise washing the glass substrate to remove the slip agent composition such that less than 8 nanogram/cm$^2$ of the slip agent composition remains on the surface of the glass substrate. In aspects described herein, when the slip agent composition is removed, the glass has a percent change in defect count of from about 0.5% to about 50%. In aspects described herein, the methods may further comprise washing the glass substrate to remove the slip agent composition such that when the slip agent composition is removed, the glass has a percent change in defect count of from about 0.5% to about 50%.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A method of protecting a glass substrate, the method comprising:
    contacting a protective film or paper and at least one surface of a glass substrate;
    wherein the protective film or paper includes a slip agent composition comprising at least one fatty alcohol having the formula R—OH, wherein R is a saturated or unsaturated, linear or branched aliphatic chain containing 12 to 30 carbon atoms.

2. The method of claim 1, wherein the slip agent composition comprises from about 75 to 100 wt. % of the at least one fatty alcohol.

3. The method of claim 1, wherein R is a saturated, linear aliphatic chain containing 12 to 26 carbon atoms.

4. The method of claim 1, wherein the at least one fatty alcohol is lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, lino leyl alcohol, arachidyl alcohol, behenyl alcohol, erucyl alcohol, or combinations thereof.

5. The method of claim 1, wherein the at least one fatty alcohol is stearyl alcohol.

6. The method of claim 1, wherein the protective film or paper includes at least about 200 nanograms/cm$^2$ of the slip agent composition.

7. The method of claim 1, wherein the protective film or paper comprises glassine, Kraft paper, parchment paper, recycled paper, cellulosic paper, polyolefins, low density polyethylene, polyethylene film, ethylene-acrylic acid (EAA) copolymers, ethylene-vinyl acetate (EVA) copolymers, nylon polymers, polyethylene terephtalate polymers, polyvinyl chloride polymers, polypropylene, or combinations thereof.

8. A method for temporary protection of a glass substrate, the method comprising:
    contacting a protective film or paper having a slip agent composition and at least one surface of a glass substrate, the slip agent composition comprising at least one fatty alcohol having the formula R—OH, wherein R is a saturated or unsaturated, linear or branched aliphatic chain containing 12 to 30 carbon atoms;
    transferring a portion of the slip agent composition from the protective film or paper to the surface of the glass substrate; and
    removing the protective film or paper from the surface of the glass substrate such that an amount of the slip agent composition remains on the surface of the glass substrate.

9. The method of claim 8, wherein the slip agent composition comprises from about 75 to 100 wt. % of the at least one fatty alcohol.

10. The method of claim 8, wherein R is a saturated, linear aliphatic chain containing 12 to 26 carbon atoms.

11. The method of claim 8, wherein the at least one fatty alcohol is lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, linoleyl alcohol, arachidyl alcohol, behenyl alcohol, or erucyl alcohol, or combinations thereof.

12. The method of claim 8, wherein the at least one fatty alcohol is stearyl alcohol.

13. The method of claim 8, wherein the amount of slip agent composition remaining on the surface of the glass substrate is sufficient for the slip agent composition to adhere to the surface of the glass substrate and act as a protective layer, and to be removed from the surface of the glass substrate by washing.

14. The method of claim 8, wherein the amount of the slip agent composition remaining on the surface of the glass substrate is from about 10 nanogram/cm$^2$ to about 1600 nanogram/cm$^2$.

15. The method of claim 8, further comprising washing the glass substrate to remove the slip agent composition such that less than 8 nanogram/cm$^2$ of the slip agent composition remains on the surface of the washed glass substrate.

16. The method of claim 8, wherein when the slip agent composition is removed, the glass has a percent change in defect count of from about 0.5% to about 50%.

17. A composite glass package comprising:
    a glass substrate; and
    a protective paper or film adhered to a surface of the glass substrate;
    wherein the protective paper or film includes a slip agent composition comprising at least one fatty alcohol having the formula R—OH, wherein R is a saturated or unsaturated, linear or branched aliphatic chain having 12 to 30 carbon atoms.

18. The composite glass package of claim 17, wherein the protective film or paper includes at least about 200 nanograms/cm$^2$ of the slip agent composition.

19. The composite glass package of claim 17, wherein the at least one fatty alcohol is lauryl alcohol, tridecyl alcohol, myristyl alcohol, pentadecyl alcohol, cetyl alcohol, palmitoleyl alcohol, heptadecyl alcohol, stearyl alcohol, isostearyl alcohol, oleyl alcohol, linoleyl alcohol, arachidyl alcohol, behenyl alcohol, erucyl alcohol, or combinations thereof.

20. The composite glass package of claim 17, wherein the at least one fatty alcohol is stearyl alcohol.

* * * * *